May 28, 1968 J. A. NAIVE 3,386,039
VARIABLE VOLTAGE-CONTROLLED FREQUENCY GENERATOR
Filed May 19, 1965
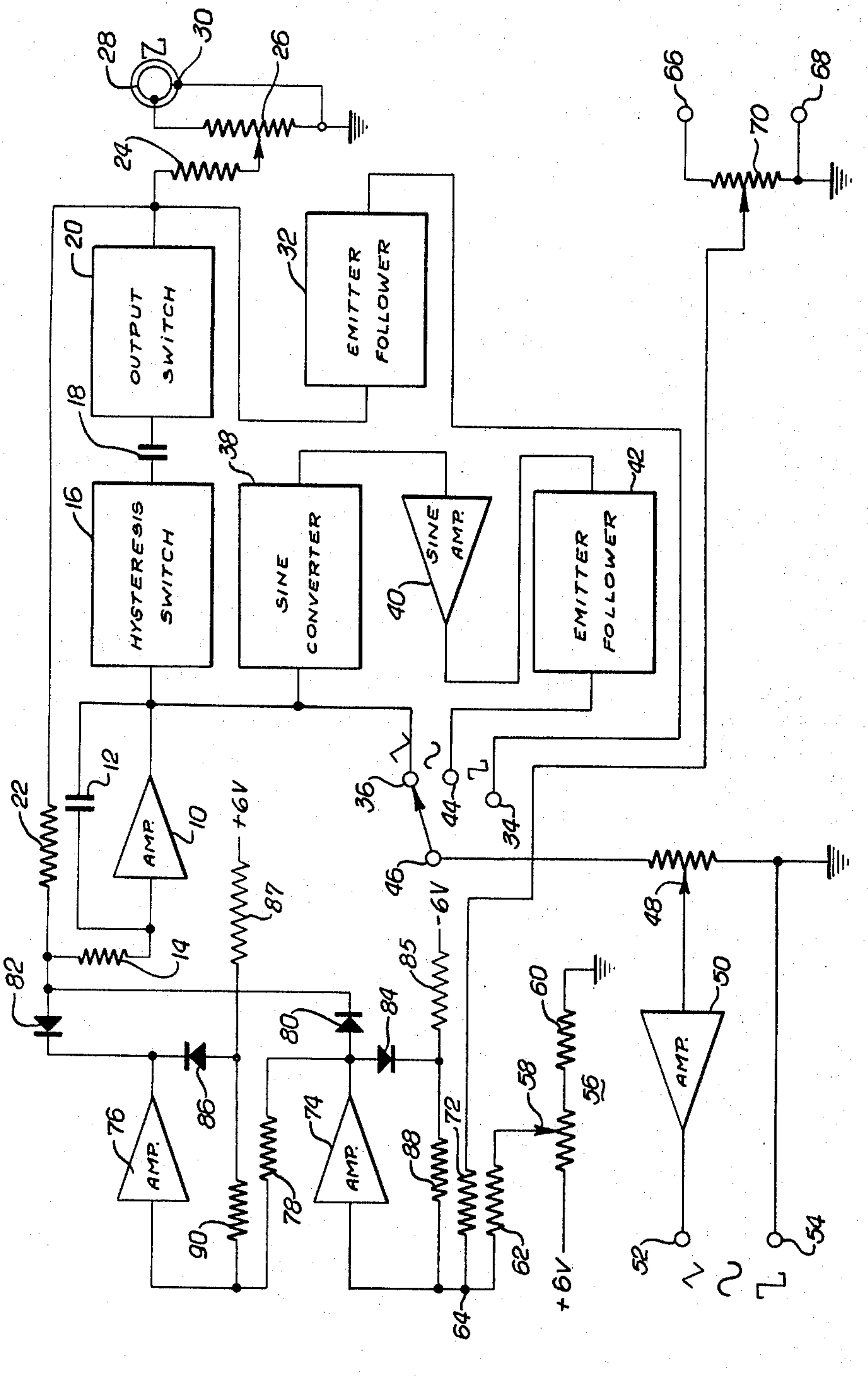
INVENTOR.
JOEL A. NAIVE
BY Smyth, Roston & Pavitt
ATTORNEYS.

United States Patent Office 3,386,039
Patented May 28, 1968

3,386,039

VARIABLE VOLTAGE-CONTROLLED FREQUENCY GENERATOR

Joel A. Naive, La Jolla, Calif., assignors to Wavetek, San Diego, Calif., a corporation of California Filed May 19, 1965, Ser. No. 457,012
14 Claims. (Cl. 328—181)

ABSTRACT OF THE DISCLOSURE

This invention relates to a variable voltage-controlled frequency generator of the type which uses a linear integrator and a switching circuit connected in series with a feedback loop between the switching circuit and the integrator to produce a triangular waveform from the linear integrator and a square waveform from the switching circuit and with a sine converter coupled from the linear integrator to produce a sine wave from the triangular wave. The invention includes controlling the repetition rate of the sine wave in accordance with the characteristics of an external signal having one terminal coupled to a reference potential such as ground and wherein the input to the linear integrator is symmetrically controlled in accordance with the characteristics of the grounded external signal. The invention also includes the use of semiconductor clamping means so as to clamp the input to the linear integrator in accordance with the characteristics of the external signal. The clamping means may include a pair of operational amplifiers in series with a pair of oppositely disposed semiconductor devices interconnected between the outputs of the operational amplifiers and the input to the linear integrator.

This invention relates to a frequency generator. More specifically, the invention relates to a frequency generator of the type wherein a linear integrator and a switching circuit are connected in series with a feedback loop between the switching circuit and the integrator to produce a triangular waveform from the linear integrator and a square waveform —from the switching circuit. The triangular waveform may then be modified by a sine convertor to form a sine wave having a repetition rate dependent upon the repetition rate of the triangular wave. The triangular wave, in addition, has a repetition rate dependent upon the repetition rate of the square wave, and the frequency of the entire system is dependent upon the charging rate of the integrator. This charging rate can be adjusted in accordance with the capacity or resistance of the integrator or may be dependent upon the amplitude of the input to the integrator. The combination of the switching circuit and the linear integrator may be of the type shown in Patent No. 2,748,272 issued to Schrock on May 29, 1956. The sine convertor may be of the type shown in Patent No. 2,748,278 issued to Smith on May 29, 1956.

This invention relates particularly to a variable voltage-controlled frequency generator. Specifically, the invention relates to a frequency generator which is controlled in accordance with the characteristics of an external signal to vary the output frequency of the frequency generator in accordance with the characteristics of the external signal. The variations in the frequency output of the generator are accomplished automatically and remotely. The frequency of the output signal produced by the frequency generator of the present invention can be controlled at any particular value or can be swept through wide ranges of frequency without any manual control.

The output frequency of the generator is voltage controlled by varying the amplitude of the square wave in accordance with the characteristics of the external signal.

The amplitude of the square wave is clamped to particular plus and minus values and the clamping levels are in accordance with the characteristics of the external signal. The clamping is accomplished through the use of clamping diodes and the external signal is actually used to control the bias on these clamping diodes. In particular, the output frequency of the generator is automatically controlled through the use of a pair of cascaded operational amplifiers which are designed to provide the proper biasing of the clamping diodes at both the plus and minus values so as to appropriately control the plus and minus values of the square wave. Since the system does not incorporate resonant circuits to control the frequency, the operation of the system is substantially instantaneous. The system, therefore, can be overmodulated by the external signal to produce unusual waveforms. The operation of the variable voltage-controlled frequency generator will become clearer with reference to the drawing wherein the figure illustrates, partially in block form and partially in schematic form, a particular embodiment of the variable voltage-controlled frequency generator according to the invention.

In the figure an amplifier 10 in combination with a capacitor 12 and a resistor 14 are connected to provide a linear integrator. The amplifier 10, for example, may be a transistorized wideband chopper-stabilized amplifier so as to obtain a wide frequency range. The resistor 14 is connected in series at the input to the amplifier 10, and the capacitor 12 is connected in parallel across the amplifier 10. The amplifier is designed to have a high gain and a high input impedance so that substantially all the current flowing through the resistor 14 also flows through the integrating capacitor 12. The current flowing through the capacitor 12 causes a linear change in the voltage across the capacitor 12 and thus a linear output voltage is produced at the output of the amplifier 10.

The output of the amplifier 10 is fed into a hysteresis switch 16 which may be, for example, a four-transistor flip-flop. The hysteresis switch 16 is biased so that it remains in one state until the input to the hysteresis switch reaches a certain predetermined level. When the predetermined level is reached, the output of the hysteresis switch 16 changes to a second state. The output from the hysteresis switch 16 is coupled through a capacitor 18 to an output switch 20, which may also be a four-transistor flip-flop. The output from the switch 20 also alternates between a first and second state in the same manner as the hysteresis switch 16. The output from the switch 20 is fed back through a resistor 22 to the resistor 14.

A positive voltage appearing at the resistor 14 causes a negative-going voltage to appear at the output of the amplifier 10. This is because the amplifier 10 is designed to invert the phase of the input signal to the amplifier 10. The negative-going voltage appearing at the output of the amplifier 10 causes the hysteresis switch 16 to switch to a positive output. The negative-to-positive switching of the hysteresis switch 16 causes the output switch 20 to switch from positive to negative, thereby reversing the input to the amplifier 10 and, in addition, reversing the slope of the output voltage from the amplifier 10. In this manner, the circuit oscillates between two conditions and produces a triangular wave at the output of the amplifier 10 and a square wave at the output of the switch 20.

The frequency of oscillation of the circuit is determined by the resistor 14 and the capacitor 12 in the integrating circuit and the amplitude value of the voltage appearing at the resistor 14. For example, a large resistance for the resistor 14 causes less current to flow, thereby resulting in a reduced rate of charge across the capacitor 12 and, therefore, producing a lower frequency. A larger value of capacitance of capacitor 12 with a particular current also causes a reduced rate of voltage change across the capacitor 12 and, therefore, a lower frequency. As less voltage is present on the resistor 14, less current again flows through the resistor 14 resulting in a lower frequency of oscillation.

The frequency generator can be used to produce many types of output signals. For example, the output from the switch 20 may be fed through voltage-dividing network including resistor 24 and potentiometer 26 to produce a constant impedance, variable-amplitude square wave at terminals 28 and 30. Also, the output from the switch 20 may be fed through an emitter follower 32 to produce a constant amplitude square wave at terminal 34.

The output from the amplifier 10 may be fed directly to output terminal 36 to provide a triangular waveform at this output terminal. In addition, the triangular waveform produced at the output of the amplifier 10 may be fed through a sine converter 38 to produce a sine wave at the output of the sine converter. The output from the sine converter 38 may be amplified by a sine amplifier 40 and fed through an emitter follower 42 to the output terminal 44. In this manner, a sine wave may be provided at the output terminal 44.

In addition to the above, the outputs at the terminals 34, 36 and 44 may all be fed through a switch 46 through a potentiometer 48 and a high-power amplifier 50. In this manner, a variable amplitude high-power output may be provided for all of the various types of waveforms at output terminals 52 and 54. It is to be appreciated that the various output schemes are illustrative only and that other output schemes may be used to provide any particular type of variable amplitude, power or impedance for the various waveforms.

The frequency of the generator is controlled in the following manner. First, a constant or base frequency is provided by a frequency dial 56. The frequency dial 56 is a combination of a potentiometer 58 and a resistor 60 connected in series between a voltage source and a reference potential such as ground. A resistor 62 is connected between the arm of the potentiometer 58 and a terminal point 64. The frequency of the generator is also controlled through an external signal. This external signal is applied to the input terminals 66 and 68 and may be of any type, for example, DC, variable DC, sine wave, square wave, triangular wave or any irregular wave shape. The external signal is applied across a potentiometer 70 and a resistor 72 is connected between the arm of the potentiometer 70 and the terminal point 64.

As can be seen, the voltage at the point 64 is dependent upon the voltages appearing at the arms of the potentiometers 58 and 70, and the voltage at the terminal point 64 will be a composite of these two voltages. The voltage at the terminal point 64 is in accordance with the characteristics of the external signal applied between the terminals 66 and 68 since the voltage provided by the potentiometer 58 is constant once the arm of the potentiometer 58 is set. The arm of the potentiometer 58 is set so that the amplitude characteristics of the external signal control the output frequency from the generator. For example, the arm of the potentiometer may be set in the middle of the frequency range, and the external signal may be used to sweep the frequency generator around the mid frequency point. The arm of the potentiometer 58 may also be set at a frequency point higher or lower than the mid frequency in accordance with the characteristics of the external signal and the desired characteristics of the frequency generator.

The signal at the point 64 is applied through a pair of cascaded operational amplifiers 74 and 76. A resistor 78 is included between the output of the amplifier 74 and the input to the amplifier 76. The amplifiers 74 and 76 in combination with their associated input and feedback resistors are operational in nature. For example, amplifier 74 in combination with resistors 62, 72 and 88 has a net gain of approximately $-\frac{1}{2}$ and amplifier 76 in combination with resistors 78 and 90 has a net gain of approximately $-1$. The two cascaded operational amplifiers control the bias voltages applied to a pair of clamping diodes 80 and 82. As the input voltage applied to the first amplifier is increased from zero to a positive voltage, the output of the first amplifier will be increased to a negative voltage and the output of the second amplifier is increased to a positive voltage. Therefore, the biasing voltages applied to the clamping diodes are spread from ground and the amplitude of the square wave appearing at the junction of the two diodes 80 and 82 increases. The increase in the amplitude of the square wave effectively increases the frequency of the generator. The combination of operational amplifiers and clamping diodes, therefore, operates as a variable clamping circuit to control the amplitude extremes of the square wave at particular levels in accordance with the amplitude characteristics of the signal applied to the terminals 66 and 68.

The clamping diodes 80 and 82 operate open circuit without any feedback around them. To compensate for this, a matched diode is placed within the feedback loop. Diode 84 is used to compensate for clamping diode 80, and diode 86 is used to compensate for clamping diode 82. Resistors 85 and 87 are connected to minus and plus sources of voltage respectively so that the diodes 84 and 86 are biased to be conductive. Feedback for the first amplifier 74 is taken from the cathode of the diode 84. Therefore, diode 84 is matched to diode 80. In addition, resistor 88 which is placed in the feedback path is designed so that the same current flows through diode 84 as the current which flows through diode 80. Therefore, the voltage at the arm of the potentiometer 70 is proportional to the voltage at the cathode of the diode 84 which is equal to the voltage at the cathode of the diode 80. In this manner, the clamping diode 80 very accurately follows the variable voltage at the arm of the potentiometer 70.

The second operational amplifier 76 operates exactly as the first operational amplifier 74 and is designed to provide the equal and opposite clamping voltage for the square wave. Resistor 90 which is placed in the feedback path is used in the same manner as resistor 88 and provides an accurate following of the clamping voltage for the square wave at clamping diode 82.

The frequency generator has a frequency output in accordance with the amplitude characteristics of the external signal applied to the terminals 66 and 68. The frequency generator is, therefore, variable voltage controlled so that the frequency of the generator may be automatically varied over a wide range using the external signal. It is to be appreciated that the embodiment shown in the figure is illustrative only and that many adaptations and modifications may be made. Therefore, the invention is only to be limited by the appended claims.

What is claimed is:

1. A variable voltage-controlled frequency generator, including first means having an input and an output for developing a first signal having a constant slope from the output, second means operatively coupled to the output of the first means and responsive to particular values of the first signal to produce a second signal having a first level in response to a first particular value of the first signal, and having a second level in response to a second particular value of the first signal, third means operatively coupled to the input of the first means and to the second means and responsive to the second signal for coupling the second signal to the input of the first means to control the first means to produce a triangular waveform for the first signal, fourth means operatively coupled to the output of the first means and responsive to the first signal having the triangular waveform to produce a sine wave having a repetition rate in accordance with the repetition rate of the triangular wave, fifth means including first and second terminals for providing an external signal having particular characteristics and with the first terminal coupled to a reference potential, and sixth means operatively coupled to the input of the first means and to the fifth means and responsive to the external signal for symmetrically controlling the slope of both sides of the triangular wave in accordance with the characteristics of the external signal to control the repetition rate of the sine wave in accordance with the characteristics of the external signal.

2. In a frequency generator of the type wherein an integrator and a switch are connected in series and with a feedback path from the output of the switch to the input of the integrator to produce a triangular wave from the integrator and a square wave from the switch, and wherein the triangular wave is applied to a sine converter, means for controlling the frequency of the sine wave produced by the sine converter in accordance with a signal from an external source, including first means including first and second terminals for receiving the signal from the external source and with the first terminal coupled to a reference potential, second means operatively coupled to the first means and responsive to the signal from the external source for providing a control signal having characteristics in accordance with the characteristics of the signal from the external source, and third means operatively coupled to the second means and to the integrator and responsive to the control signal for symmetrically controlling the input to the integrator in accordance with the characteristics of the control signal to control the frequency of the sine wave in accordance with the characteristics of the signal from the external source.

3. A variable voltage-controlled frequency generator, including first means having an input and an output for developing a first signal having a constant slope from the output, second switch means having first and second states operatively coupled to the output of the first means and responsive to particular values of the first signal to switch between the first and second states in accordance with the particular values of the first signal to produce a square wave having a repetition rate in accordance with the slope of the first signal, third means operatively coupled to the input of the first means and to the second switch means and responsive to the square wave for coupling the square wave to the input of the first means to control the first means to produce a triangular wave for the first signal and with the repetition rate of the triangular wave in accordance with the repetition rate of the square wave, fourth means operatively coupled to the output of the first means and responsive to the triangular wave to produce a sine wave having a repetition rate in accordance with the repetition rate of the triangular wave, fifth means including first and second terminals for providing an alternating signal having amplitude variations and with the first terminal coupled to a reference potential, and sixth means operatively coupled to the first means and the fifth means and responsive to the alternating signal for symmetrically varying the slope of both sides of the triangular wave in accordance with the amplitude variations of the alternating signal to produce variations in the repetition rate of the sine wave in accordance with the amplitude variations of the alternating signal.

4. In a frequency generator of the type wherein an integrator and a switch are connected in series and with a feedback path from the output of the switch to the input of the integrator to produce a triangular wave from the integrator and a square wave from the switch, and wherein the triangular wave is applied to a sine converter, means for varying the frequency of the sine wave produced by the sine converter in accordance with an alternating signal from an outside source, including first means including first and second terminals for receiving the alternating signal from the outside source and with the first terminal coupled to a reference potential, second means operatively coupled to the first means and responsive to the alternating signal for providing a control signal having variations in accordance with amplitude variations of the alternating signal, and third means operatively coupled to the second means and to the integrator and responsive to the control signal for symmetrically varying the amplitude of the input to the integrator in accordance with the variations of the control signal to produce variations in the frequency of the triangular wave and to produce corresponding variations in the frequency of the sine wave in accordance with the variations in amplitude of the alternating signal.

5. A variable voltage-controlled frequency generator, including first means having an input and an output for developing a first signal having a particular slope from the output in accordance with the amplitude of the input, second switching means operatively coupled to the output of the first means and responsive to particular values of the first signal to switch between first and second states to produce a square wave, third means operatively coupled to the input of the first means and to the second means and responsive to the square wave for coupling the square wave to the input of the first means to control the first means to produce a triangular waveform for the first signal, fourth means operatively coupled to the output of the first means and responsive to the first signal having the triangular waveform to produce a sine wave having a repetition rate in accordance with the repetition rate of the triangular wave, fifth means for providing an external signal having variable amplitude characteristics, sixth means for providing a signal having constant amplitude characteristics, seventh means coupled to the fifth and sixth means for summing the signals having constant and variable characteristics to produce a control signal having variable amplitude characteristics in accordance with the sum of the signals, and eighth means operatively coupled to the input of the first means and to the seventh means and responsive to the control signal for varying the amplitude of the square wave in accordance with the amplitude characteristics of the control signal to control the repetition rate of the sine wave in accordance with the amplitude characteristics of the control signal.

6. In a frequency generator of the type wherein an integrator and a switch are connected in series and with a feedback path from the output of the switch to the input of the integrator to produce a triangular wave from the integrator and a square wave from the switch, and wherein the triangular wave is applied to a sine converter, means for controlling the frequency of the sine wave produced by the sine converter in accordance with the variable amplitude characteristics of a signal from an external source, including first means for receiving the signal from the external source, second means for providing a signal having constant amplitude characteristics, third means for receiving the signals from the first means and the second means for summing the signals having constant and variable characteristics to produce a control signal having variable amplitude characteristics in accordance with the sum of the signals, and fourth means operatively coupled to the output of the switch and to the third means and responsive to the control signal for controlling the amplitude of the square wave in accordance with amplitude characteristics of the control signal to control the frequency of the triangular wave in accordance with the amplitude of the square wave for controlling the frequency of the sine wave.

7. A variable voltage-controlled frequency generator, including first means having an input and an output for developing a first signal having a particular slope from the output in accordance with the amplitude of the input, second switching means operatively coupled to the output of the first means and responsive to particular values of the first signal to switch between first and second states to produce a square wave, third means operatively coupled to the input of the first means and to the second means and responsive to the square wave for coupling the square wave to the input of the first means to control the first means to produce a triangular waveform for the first signal, fourth means operatively coupled to the output of the first means and responsive to the first signal having the triangular waveform to produce a sine wave having a repetition rate in accordance with the repetition rate of the triangular wave, fifth means for providing an external signal having variable characteristics, and clamping means operatively coupled to the input of the first means and to the fifth means and responsive to the external signal for clamping the amplitude values of the square wave in accordance with the variable characteristics of the external signal to control the repetition rate of the sine wave in accordance with the characteristics of the external signal.

8. The variable voltage-controlled frequency generator of claim 7 wherein the clamping means symmetrically controls both the plus and minus values of the square wave in accordance with the variable characteristics of the external signal.

9. In a frequency generator of the type wherein an integrator and a switch are connected in series and with a feedback path from the output of the switch to the input of the integrator to produce a triangular wave from the integrator and a square wave from the switch, and wherein the triangular wave is applied to a sine converter, means for controlling the frequency of the sine wave produced by the sine converter in accordance with a variable signal from an external source, including first means for receiving the variable signal from the external source, clamping means operatively coupled to the input of the integrator and to the first means and responsive to the signal from the external source for clamping the amplitude values of the square wave in accordance with the variable characteristics of the signal from the external source to control the frequency of the triangular wave in accordance with the amplitude values of the square wave for controlling the frequency of the sine wave.

10. The frequency generator of claim 9 wherein the clamping means symmetrically controls both the plus and minus values of the square wave.

11. A variable voltage-controlled frequency generator, including first means having an input and an output for developing a first signal having a particular slope from the output in accordance with the amplitude values of the input, second switching means operatively coupled to the output of the first means and responsive to particular values of the first signal to switch between first and second states to produce a square wave, third means operatively coupled to the input of the first means and to the second means and responsive to the square wave for coupling the square wave to the input of the first means to control the first means to produce a triangular waveform for the first signal, fourth means operatively coupled to the output of the first means and responsive to the first signal having the triangular waveform to produce a sine wave having a repetition rate in accordance with the repetition rate of the triangular wave, fifth means for providing an alternating signal having amplitude variations, and clamping means including semiconductor devices operatively coupled to the input of the first means and the fifth means and responsive to the alternating signal for varying the bias on the semiconductor devices in accordance with the amplitude variations of the alternating signal to symmetrically clamp the amplitude values of the square wave in accordance with the amplitude variations of the alternating signal.

12. The variable voltage-controlled frequency generator of claim 11 wherein the clamping means includes a pair of operational amplifiers in series with a pair of semiconductor devices oppositely poled between the outputs of the operational amplifiers and the input to the first means.

13. In a frequency generator of the type wherein an integrator and a bistable switch are connected in series and with a feedback path from the output of the bistable switch to the input of the integrator to produce a triangular wave from the integrator and a square wave from the bistable switch, and wherein the triangular wave is applied to a sine converter, means for varying the frequency of the sine wave produced by the sine converter in accordance with an alternating signal from an outside source, including first means for receiving the alternating signal from the outside source, clamping means operatively coupled to the input of the integrator and to the first means for symmetrically clamping the amplitude values of the square wave, and third means operatively coupled to the first means and to the clamping means and responsive to the alternating signal for controlling the bias on the clamping means in accordance with the variations in amplitude of the alternating signal for symmetrically varying the clamping of the square wave to varying amplitude values.

14. The frequency generator of claim 13 wherein the third means includes a pair of operational amplifiers in series and wherein the clamping means includes at least a pair of semiconductor devices oppositely poled between the outputs of the operational amplifiers and the input to the integrator.

References Cited

UNITED STATES PATENTS

| | | | |
|---|---|---|---|
| 2,748,278 | 5/1956 | Smith | 328—21 X |
| 2,842,664 | 7/1958 | Martin | 307—88.5 X |
| 3,256,426 | 6/1966 | Roth et al. | 328—127 X |

JOHN S. HEYMAN, *Primary Examiner.*

ARTHUR GAUSS, *Examiner.*

J. ZAZWORSKY, *Assistant Examiner.*

Disclaimer 3,386,039.—*Joel A. Naive*, La Jolla, Calif. VARIABLE VOLTAGE-CONTROLLED FREQUENCY GENERATOR. Patent dated May 28, 1968. Disclaimer filed Sept. 22, 1969, by the assignee, *Wavetek*.

Hereby enters this disclaimer to claims 1 and 2 of said patent.

[*Official Gazette February 24, 1970.*]